United States Patent [19]

De Vries et al.

[11] Patent Number: 5,078,345
[45] Date of Patent: Jan. 7, 1992

[54] AUTOMATED APPROACH SPEED CONTROL FOR AN AIRPLANE

[75] Inventors: Luitzen De Vries, Amstelveen; Jan Meuzelaar, Hoofddorp, both of Netherlands

[73] Assignee: Fokker Aircraft B.V., Netherlands

[21] Appl. No.: 610,518

[22] Filed: Nov. 8, 1990

[30] Foreign Application Priority Data

Nov. 10, 1989 [GB] United Kingdom ............ 8925398.3

[51] Int. Cl.$^5$ ............................................ G05D 1/08
[52] U.S. Cl. ............................ 244/182; 244/188; 244/195; 244/183; 364/431.07; 318/583
[58] Field of Search ............ 244/182, 188, 194, 195, 244/183; 364/431.02, 431.01, 431.07; 318/583

[56] References Cited

U.S. PATENT DOCUMENTS

| | | |
|---|---|---|
| 2,553,983 | 5/1951 | Saxman, Jr. ............ 244/188 X |
| 2,670,157 | 2/1954 | Peterson .................... 244/188 |
| 2,798,682 | 7/1957 | Alderson et al. ........... 318/583 X |
| 3,096,955 | 7/1963 | Priestley ..................... 244/188 |
| 3,456,172 | 7/1969 | Hendrick et al. ........... 244/195 X |
| 3,626,163 | 12/1971 | Dommasch .................. 318/583 X |
| 4,093,158 | 6/1978 | Clews et al. ................ 244/182 |
| 4,209,152 | 6/1980 | Stephan ...................... 244/182 |
| 4,245,805 | 1/1981 | Stephan ...................... 244/188 |
| 4,958,289 | 9/1990 | Sum et al. .................. 364/431.01 |

FOREIGN PATENT DOCUMENTS

| | | |
|---|---|---|
| 0030066 | 6/1981 | European Pat. Off. . |
| 0109315A | 5/1984 | European Pat. Off. . |
| 1190198A | 4/1970 | United Kingdom . |
| 1233275A | 5/1971 | United Kingdom . |
| 1340155A | 12/1973 | United Kingdom . |
| 1374101A | 11/1974 | United Kingdom . |

Primary Examiner—Joseph F. Peters, Jr.
Assistant Examiner—Christopher P. Ellis
Attorney, Agent, or Firm—Handal & Morofsky

[57] ABSTRACT

A flight control system of a turboprop airplane includes electronic controlled engines, which are governed by a manual operating device for setting the engine power in order to obtain a certain airspeed, a device for selecting a desired airspeed, and an engine control system for computing and controlling the required engine torque and speed as a function of ambient and engine conditions, the selected engine speed and the setting of said operating device. For automatically controlling the engine speed during the final approach to an airfield, the system includes an electronic approach speed control unit of which the adjustment signal influences the engine control device keeping the speed of the airplane during approach at a selected value whereby said manual operating device has a fixed setpoint. This electronic speed control unit may be carried out as an add-on device for retrofitting on a flight control system.

8 Claims, 4 Drawing Sheets

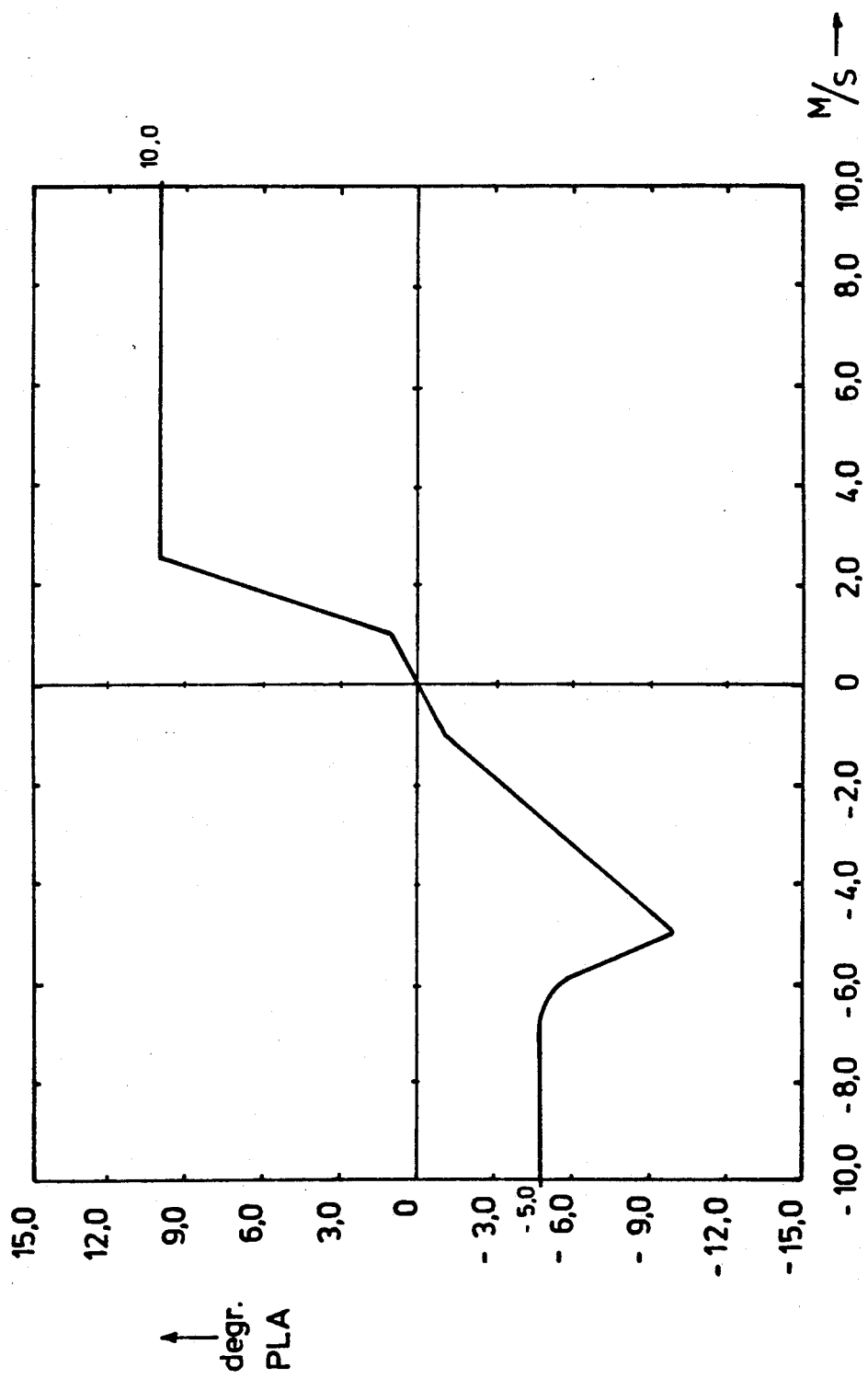

AUTOMATED APPROACH SPEED CONTROL FOR AN AIRPLANE

BACKGROUND OF THE INVENTION

The invention relates to systems for controlling automatically the engine power of an aircraft during its final approach to the airfield.

DESCRIPTION OF PRIOR ART

Most commercial transport aircraft are equipped with an automatic flight control system. The capability of the airborne equipment and the electronic and visual ground aids defines to what extent automatic approaches and landings are allowed by the airworthiness authorities with regard to the weather conditions. Because of the difference in operations between short haul commuter and business turboprop airplane and the bigger long range turbojet airplanes, the commuters have in general a less costly automatic flight control system.

Typically the system of a turboprop commuter provides in the phase of the approach to the runway of an airfield an automatic control and stabilisation of the airplane about all three axes, but there is no autothrottle. In such a flight practice when the pilot has selected the landing gear, the wing flaps and with the power levers an engine power to accomplish a nominal speed during approach, the autopilot tracks at the glideslope and the localizer beam from the runway landing system.

Meanwhile the pilot holds the nominal recommended approach speed by manual resetting the power lever to avoid that the airplane deviates too much from the ideal descend path by speed variations. In the case of an excessive deviation between the position of the airplane with regard to the beam, a warning is given at the primary flight display by pointers. It is possible that such a warning occurs in the final phase of the approach at the official minimum height for the particular airplane to decide about enough visibility to perform a safe landing. When the visibility is below the limit, the pilot shall decide to discontinue the approach and execute a go-around.

In general the performance of speed corrections to obtain a minimum deviation between actual and theoretical descent path depends on variable human factors. Therefore a first disadvantage of a manual correction method is the dependancy of the performance by the pilot. The quality of the performance can be influenced in an abnormal situation during approach if the pilot does not reset the power lever frequent enough, or, in normal approach situations, if the pilot's resetting of the power lever is brusque.

Another disadvantage is that manual approach power settings are not always symmetrical, thus causing instable localizer tracking. A further disadvantage of the method is that the pilot has to monitor the speed indicator, and react on significant deviations by moving the power lever and watch after a while the result at the speedometer. The given attention increases the workload of the pilot especially during landings with windshear or bad visibility.

Yet another disadvantage of the system is caused by the rapid growth or drop of the power of a modern electronic controlled turboprop engine upon an incremental adjustment of the power lever. In the case of more power and hence an increase of the speed of the aircraft, the increased slipstream of the propeller rises the lift of the wing and makes the aircraft to diverse from the ideal flight path.

SUMMARY OF THE INVENTION

The shortcomings of manual speed control during final approach are overcome by a novel approach speed control system provided by this invention, which system comprises an electronic approach speed control unit of which the adjustment signal influences the engine control device keeping the speed of the airplane during approach at a selected value whereby said manual operating device has a fixed setpoint. During the approach to the airfield, the system holds the speed of the airplane at the value commanded by the pilot through a power lever setting before starting the approach, or, at the value adjusted by him during the approach. Typically the system controls the power of the engine electronically only and thus leaving the power lever where it is, namely the last position selected by the pilot.

The flight control systems according to the state of the art usually contain means for comparing the actual airspeed with the desired airspeed and for generating an error signal.

In embodiments employing such flight control systems, the invention further provides the advantage of smooth transitions during speed changes when the extreme rates of speed changes authorized by the system are determined by the magnitude of said speed error and by the time that the speed error exists.

Preferably, the extreme rate of the adjustments signal is higher for increasing power and lower for decreasing power. In this preferred embodiment, the flight control system offers a behaviour which closely resembles the way a pilot would handle the aircraft during approach.

Finally, the approach speed control unit may be carried out as an add on device for retrofitting on an automated flight control system.

BRIEF DESCRIPTION OF THE DRAWINGS

FIG. 4 is an example of the non-symmetric diagram shown in FIG. 3.

DESCRIPTION OF THE PREFERRED EMBODIMENT

Figure 1:
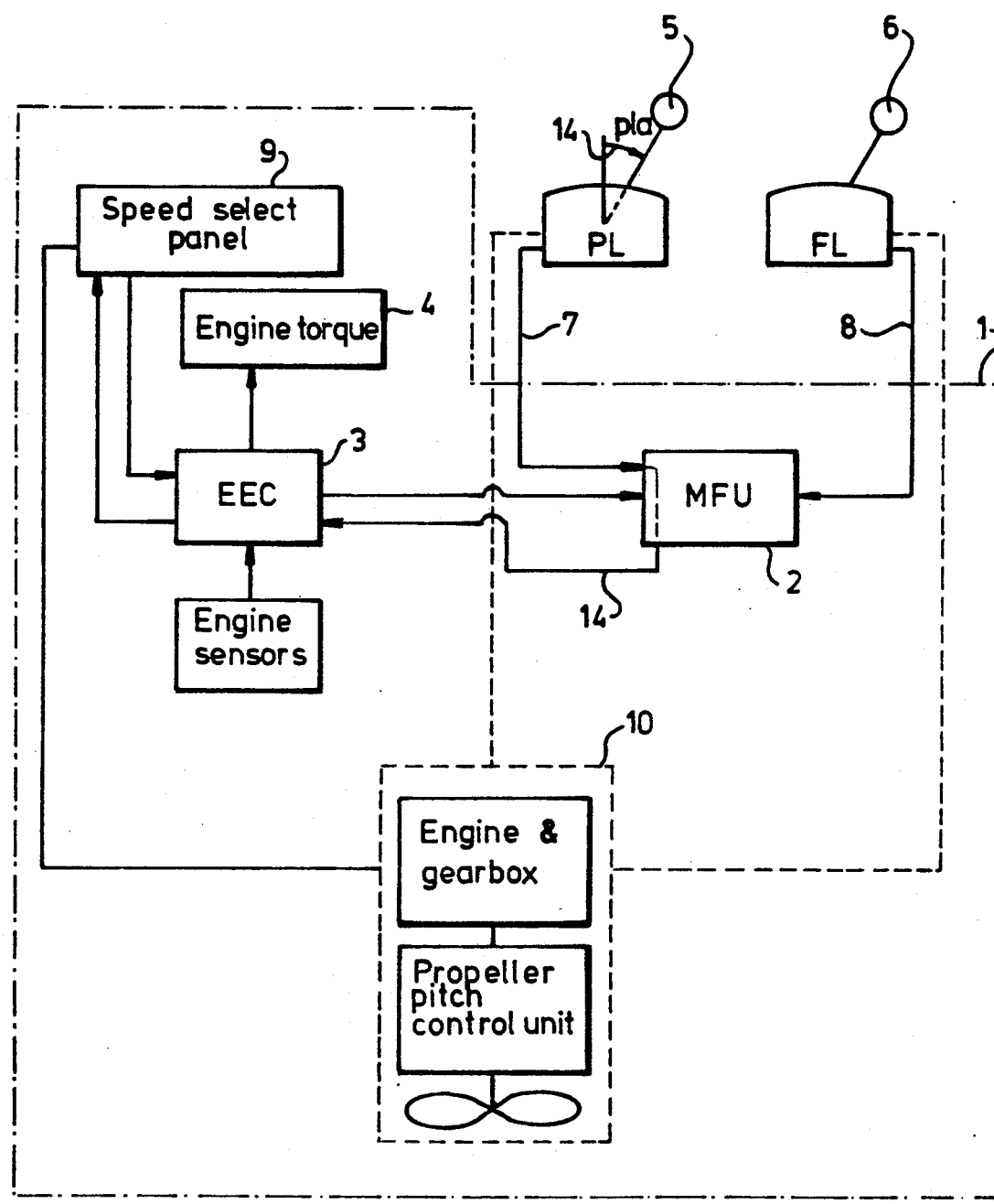
FIG. 1 is a block diagram of a prior art engine and propeller control system.

The present invention is applicable for a turboprop airplane with electronic controlled engines. Such a control system (1), as shown in FIG. 1, will comprise in general per engine of three main components, a (2) Mechanical Fuel Control Unit (MFU), an (3) Engine Electronic Control Unit (EEC), a (4) Torque Indicator and the power plant (10), with gear box and propeller pitch control system. There is an electrical harness to link these together with engine sensors, actuators and airframe signals. The main function of these three components will be pointed out first in order to describe how the add-on system of the invention fits into the power-and propeller speed control system.

The MFU (2) is actuated by the pilot through the Power Lever (PL, 5) and Fuel Shut-off Lever (FL, 6)

on the flight compartment pedestal via associated cable/rod connecting systems (7 and 8).

The mechanical power lever setting is transformed by a sensor in the MFU to an electronic signal representing the Power Lever Angle, and this signal is hereinafter referred to as the PLA or (PLA 14). It is this signal which is used in a preferred embodiment of the invention. The MFU (2) provides essential fuel metering from the fuelpump to the engine thus determining engine power output. The PL(5) and FL(6) also operate the Propeller Pitch Control Unit (PCU). The PCU (1) is a microprocessor controlled machine which provides signals for accurate propeller speed control and phase synchronisation. The EEC (3) modulates the MFU's fuel metering of the particular engine in accordance with certain power management functions to reduce pilot workload, to compensate for ambient condition and to provide some engine parameter indications.

The engine speed is selected by the pilot at the Speed Rating Panel (9). The EEC (3) is microprocessor controlled and compares inputs to referenced data stored in its memory. It continuously calculates the rated torque corresponding to the pilot selected target torque or power rating, based on changes in ambient pressure, engine inlet temperature and aircraft speed. The target torque rating and the actual torque are displayed in the flight compartment. For optimal flight operation the pilot uses the information to adjust the power lever in order to maintain the actual torque level at the computed torque level.

For approach the pilot chooses an appropriate airspeed and engine torque. By setting the Power Lever the selected torque can be read from the above mentioned Torque Indicator.

GENERAL LAY-OUT OF THE SYSTEM OF THE INVENTION

Figure 2:
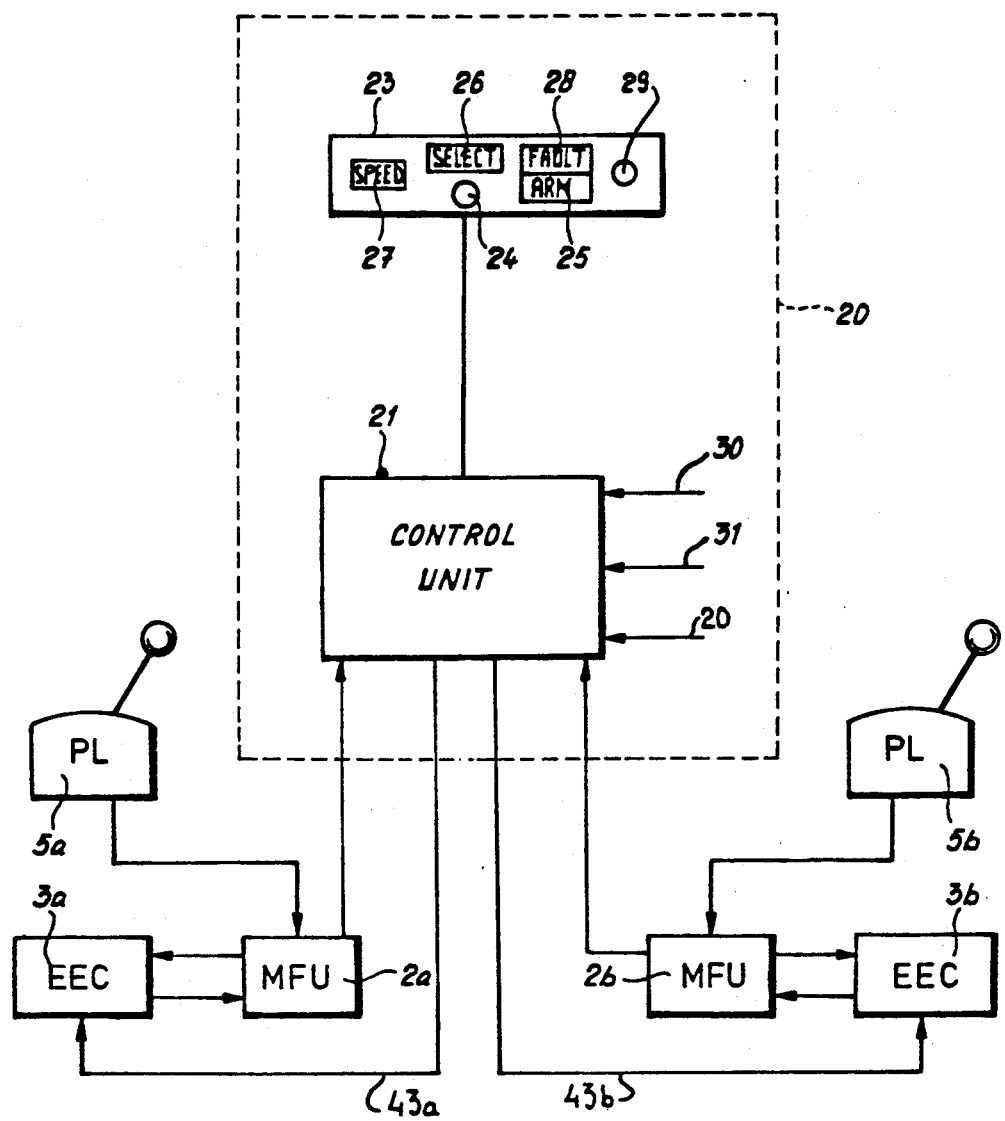
FIG. 2 is a block diagram of a preferred embodiment of the present invention, implemented in the prior art engine and propeller control system of FIG. 1.

Turning now to FIG. 2 for a general description of the Approach Speed Control Unit. Shown in FIG. 2 is a preferred embodiment for a two engined airplane. The system (20) can be activated by the pilot during the final approach phase. The system (20) will electronically vary both power lever angle signals sensed from Power Levers (5a and 5b) only electronically only within built-in authority limits through separate power lever modulators seen by the EEC's (3a and 3b). The system (20) comprises filters and limiters to remove unwanted frequencies from the input signals and to limit the amplitude thereof to avoid the system reacting to small irregularities in acceleration and speed.

The Approach Speed Control System (20) is an add-on system that interfaces electrically with the above mentioned MFU (2) and the EEC (3). The system (20) comprises a Control Unit (21), and a central Flight Deck Panel (23) in the cockpit. It is connected through line 22 with the airplane's Integrated Alerting Unit (IAU), not shown. The Control Unit (21) receives through line 30 the Indicated Airspeed Signal (IAS) from the Air Data Computer, not shown, and through line 31 the airplane pitch angle signal from the Heading and Reference System, not shown. The Flight Deck Panel (23) is used by the pilot to pre-select the desired speed, to arm and to engage/disengage the Approach Speed Control System. The flight deck panel (23) comprises a pushbutton (29) for arming and disarming the Approach Speed Control System (20), an armed indicator light (25), a speed display (27), a speed select knob (24) which is rotatable to indicate a speed and releasably depressible to select that speed and a select indicator light (26).

The system is armed by depressing the push button (29) on the Flight Deck Panel (23). The ARM light (25) comes on and the SPEED-display (27) indicates the default speed. The pilot may select then any desired approach speed by rotating the Speed Select Knob (24). There is a minimum selectable speed for safety reasons, and there is a maximum selectable speed which is limited by the Air Data Computer of the airplane. After the desired approach speed is selected, the Power Levers (5) are manually retarded to an appropriate marking on the power level quadrant representing the nominal PL position for approach. Subsequently the approach system (20) is engaged by pushing Speed Select Knob (24) and the SELECT light (26) will come on. From then on the airplane will decelerate while the deceleration is limited by the system. When the selected speed is reached, the approach control system (20) will hold that speed.

However, if the PL's (5) are not retarded and thus not in range with the selected speed, the system can not be engaged. Engagement by the pilot is also not possible when a fault is detected by the system during arming. In that case a display (28) would indicate FAULT while the Speed Display (27) remains blank. When the system (20) is control in after engaging and a system fault is detected, an alert will be generated by the airplane's Integrating Alerting Unit. The system will disconnect smoothly, automatically the SPEED-display (27) will become blank and the select light (26) will be off.

If the pilot prefers to make the approach at different selected speed, he changes the selected speed by means of the select knob 24.

The system is switched off automatically when the pilot moves one or both power levers towards or backwards outside the PLA-select range for the Approach Speed Control System, or when the pilot pulls the power levers back to idle just before touch down. The system goes down also when the air data computer becomes invalid, or when a system fault is detected by the Integrating Alerting Unit.

DESCRIPTION IN MORE DETAIL OF A PREFERRED EMBODIMENT

Figure 3:
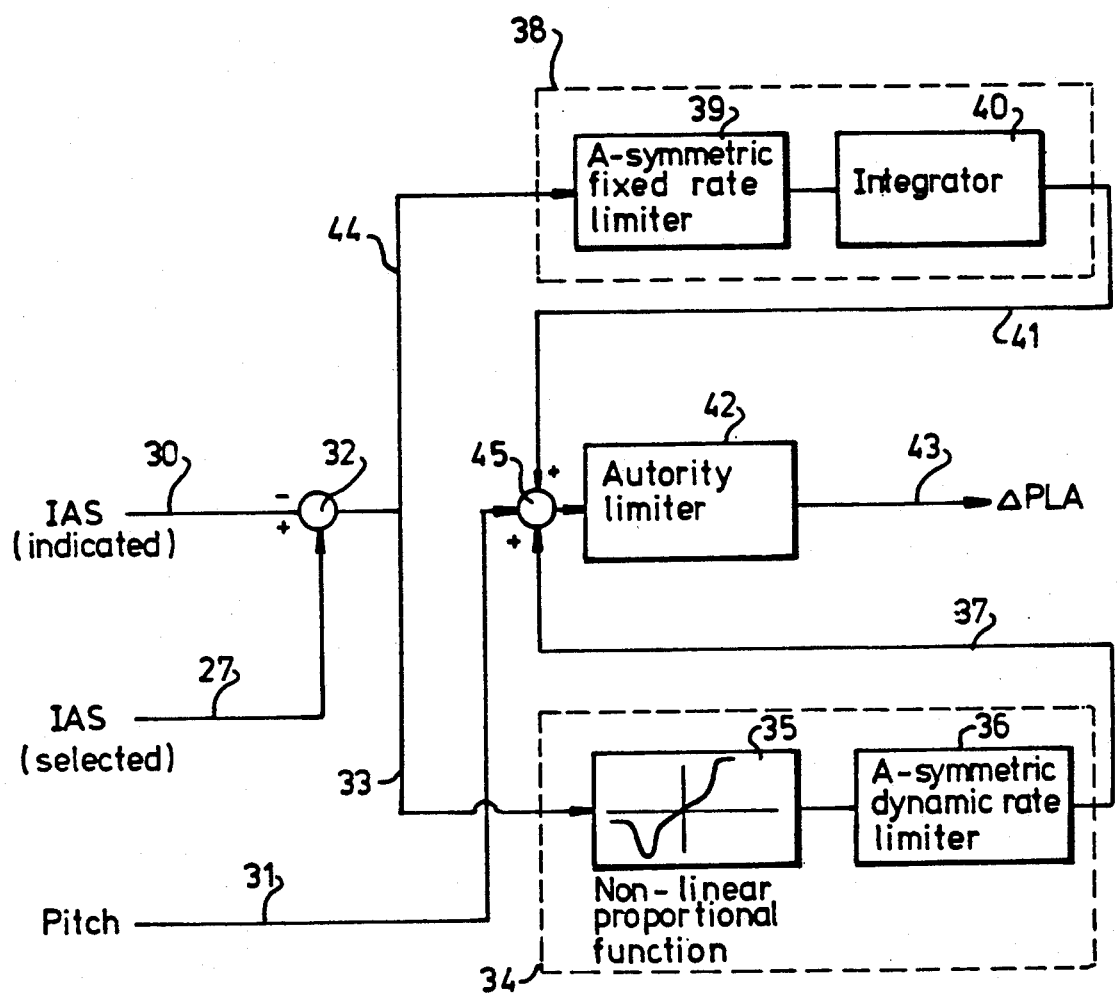
FIG. 3 is a block diagram of another embodiment of the system of the present invention.

Turning now to FIG. 3 for a description in detail of a preferred embodiment of the Approach Speed Control System, the Indicated Airspeed (30) and the Selected or Reference Airspeed (27) are compared in the summing point (32). In case there is a difference, the error signal (33) is delivered to a first and a second control circuit, (34) and (38). The control circuits were designed after ample observation of the pilots' manual response by moving the power lever, to deviations of the indicated airspeed from the selected airspeed. While shaping the diagram (see FIG. 4) the influence at the airspeed of the corrections by the autopilot of the approach trajectory was taken into account also. The observations showed for example that the graphic relation between the speed error and the reset of the power lever (PLA) should be asymmetric, in order to obtain that the Approach Speed Control System responds more reactive to a too low airspeed than when the airspeed is too high. Another observation was that the response of the Approach Speed Control System should be limited for example to $+/-10$ degrees PLA and 2 degrees PLA per second. The first control circuit (34) which reacts to short term fluctuations of the error signal, while the second circuit

(38) calculates a mean value of the error signal on a much longer period of time than the first circuit, for example 15 times longer.

The first control circuit (34) comprises a non-linear proportional function (35) and an asymmetric dynamic rate limiter (36). The error signal (33) is transformed by the circuit (34) to provide a first PLA-adjustment input signal (37) of the electronic signal PLA to of the summing point (45). The second control circuit (38) comprises an asymmetric fixed rate limiter (39) and a integrator (40). The rate limiter (39) ensures that the rapidity with which a maximum PLA-correction is executed is limited, so that a PLA-correction of a too-low airspeed is executed faster than the PLA-correction of the same value in the case of a too-high airspeed. The first and the second control circuit, respectively (37) and (41), are added in the summing point (45).

The third input signal (31) to the summing point (45) compensates for the contribution of a component of the mass of the airplane in the direction of the speed of the airplane. During the descent trajectory the component of the airplane mass in the direction of the speed vector differs with the pitch attitude of the aircraft. For compensation the pitch angle (31) is deducted or added to the above mentioned speed error (33). The output signal (43) of the authority limiter (37) is supplied to the EEC (3) of each engine.

The signals 37, 41 and 31 are summed in the junction (45) and the resulting signal is led to the authority limiter (42). For reasons of safety the limiter (42) prevents the Approach Speed Control System from providing the EEC (3) with a PLA-correction signal above for example +/−10 degrees.

We claim:

1. A flight control system for a turboprop airplane having electronically controlled engines and having engine-governing means comprising:
   a) a device for selecting a desired airspeed;
   b) a manually operable power-setting device on a flight deck for setting the engine power to obtain the selected airspeed; and
   c) an engine control system for computing and controlling the required engine torque and speed as a function of ambient and engine conditions, of the selected engine speed and of the setting of said operating device;

which flight control system also has an electronic approach speed control unit including:
   d) means to generate a power-adjustment signal in response to airspeed which signal can influence the engine control system to keep the speed of the airplane during approach at the selected value; and
   e) electronic means to adjust the engine power in response to the engine adjustment signal and independently of movements of said manually operable power-setting device;

whereby speed-control adjustments can be effected while leaving the manually operable power-setting device fixed at its setpoint position.

2. A flight control system according to claim 1 containing means for comparing the actual airspeed with the desired airspeed and for generating an error signal, wherein the extreme rates of speed changes authorized by the system are determined by the magnitude of said speed error and by the time that the speed error exists.

3. A flight control system according to claim 1 wherein, the extreme rate of the adjustment signal is higher for increasing power and lower for decreasing power.

4. A flight control system according to claim 3 wherein, the magnitude and the extreme rates of the adjustment signal are determined by a non-linear function of said speed error.

5. A flight control system according to claim 1, wherein the adjustment signal compensates for the effect of the pitch angle.

6. An approach speed control unit according to claim 1 in the form of an add-on device for retrofitting to a flight control system.

7. A flight control system according to claim 1, wherein the engine control system includes an electronically adjustable fuel-metering means to control the engine power, which fuel-metering means is also actuatable by said manually operable power-setting device on the flight deck and wherein the speed control adjustment signal is applied to the engine control system, thence to the fuel regulator, whereby the manually operable power-setting device is disengaged from the fuel-metering means during the adjustments.

8. A system according to claim 1, wherein the speed control unit intervenes to control the power of the engine in a wholly electronic manner.

* * * * *